Patented June 3, 1952

2,599,337

UNITED STATES PATENT OFFICE 2,599,337

LUBRICATING OIL ADDITIVES

Eugene Lieber, Chicago, Ill., and Edward P. Cashman, Bayonne, N. J., assignors to Standard Oil Development Company, a corporation of Delaware No Drawing. Application March 26, 1948,
Serial No. 17,365

9 Claims. (Cl. 252—48.2)

This invention relates to novel chemical products and to methods of preparing same, and more particularly it relates to the preparation of chemical condensation products having improved wax modifying properties, particularly for use as pour depressors for waxy mineral lubricating oils.

It is known that wax modifying agents may be prepared by condensation of relatively long chain paraffinic materials such as chlorinated paraffin wax or olefins corresponding thereto, with aromatic hydrocarbons such as naphthalene, benzene, toluene, anthracene, phenanthrene, mixed coal tar aromatics, etc., as well as hydroxy or amine derivatives of such aromatic hydrocarbons, e. g. phenol, cresols, naphthols, aniline, xylidine, etc.

The condensation of such materials has generally been carried out in the presence of a Friedel-Craft catalyst such as aluminum chloride, zinc chloride, boron fluoride, etc., preferably in the presence of an inert solvent such as a refined kerosene, tetrachlorethane, dichlorbenzene, etc., and at a temperature ranging from about room temperature to about 300° F., preferably not exceeding about 200° F., and generally using proportions of about 2 to 5 mols of the chlorwax type of constituent to 1 mol of the aromatic constituent. For example, about 10 to 20 parts by weight of naphthalene may be condensed with 100 parts by weight of chlorinated paraffin wax having about 10 to 20% chlorine, preferably about 12 to 15% chlorine, in the presence of about 100 to 300 parts by weight of a refined kerosene solvent, and using about 1 to 3% by weight of aluminum chloride catalyst based on the weight of the chlorinated paraffin wax, starting the reaction at room temperature, and gradually raising the temperature of the reaction mixture to a final temperature of about 90° F. for about 5 hours. Residual catalyst may then be hydrolyzed and removed by washing with water, alcohol, aqueous caustic soda or dilute hydrochloric acid, etc., settling and drawing off the resultant sludge, and finally the desired high molecular weight Friedel-Craft condensation product is removed from the reaction mass by distillation under reduced pressure such as under vacuum of about 1 to 50 mm. mercury absolute pressure, or by steam distillation, to a temperature of about 600° F.

The distillation residue thus obtained is a wax modifying agent which is oil-soluble, has an average molecular weight of above about 1,000, preferably about 1,500 to 5,000, and generally has very good pour depressing properties as determined by the standard ASTM pour point test. For instance, when added in amounts ranging from 0.1 to 2.0% to a waxy mineral lubricating oil having a pour point of +30° F., the resulting blend will generally have pour points ranging from —10° F. or —20° F. down to below —35° F. which is generally the lowest temperature tested.

However, under field conditions of winter storage, where the oil blends are subjected to frequent fluctuations of high and low temperatures, these blends have sometimes been found to be solid at temperatures substantially above the ASTM pour point, and these blends did not show as good pour stability, as measured by the Test V procedure (described in the Oil and Gas Journal, June 24, 1943), as might be desired. It is one of the primary objects of the present invention to modify those Friedel-Craft condensation products in such a way as to produce pour depressors having improved pour stability.

Broadly, the present invention comprises modifying such wax modifiers and pour depressors, which may be referred to as high molecular weight Friedel-Craft condensation products of a long chain aliphatic compound and an aromatic compound, by reacting them with an aromatic sulfonyl halide.

Examples of suitable sulfonyl halogen compounds which may be used include toluene sulfonyl chloride, xylene sulfonyl chloride, anthraquinene sulfonyl chloride, naphthalene sulfonyl chloride, etc.

The secondary reaction, i. e., the condensation of the initial aliphatic-aromatic wax modifier with the sulfonyl halide, is brought about under substantially the same conditions as used in the initial condensation, i. e., with the same type of Friedel-Craft catalyst, and at substantially the same or slightly lower temperature range, and preferably in the presence of an inert solvent.

In carrying out the invention, several alternative procedures may be used. For instance, the initial Friedel-Craft condensation reaction may be completed and the desired initial high molecular weight condensation product separated by hydrolysis and removal of residual catalyst, and recovered by distillation under reduced pressure, and then subsequently redissolved in a suitable inert solvent and subjected to the secondary condensation by adding the desired amount of reactive aromatic sulfonyl halide, e. g. benzene sulfonyl chloride, and a Friedel-Craft catalyst such as a small amount of aluminum chloride.

It has been found advantageous, however, to add the sulfonyl halide directly to the total reaction product of the first condensation prior to the hydrolysis step, and to continue the reaction under the same conditions, adding additional catalyst if necessary. In this manner it is possible to have only one set of finishing steps, including catalyst hydrolysis and removal, and distillation.

The resulting second or final condensation product is found to have not only good pour de-depressing properties as measured by the ASTM pour point test, but also improved pour stability as measured by the Test V procedure referred to above.

The final condensation product of this invention has a molecular weight somewhat higher than that of the initial condensation product, due to the subsequent chemical condensation but it is still soluble in hydrocarbon oils such as waxy mineral lubricating oil and may be used in concentrations ranging from as little as .01% to 5.0%, preferably 0.05% to 1.0% in such waxy or highly paraffinic lubricating oil basestocks. It may also be used in lubricating grease compositions comprising essentially a waxy oil thickened with a suitable grease-forming soap such as calcium stearate, aluminum stearate, or sodium, lithium or other metal stearates, oleates, naphthenates, etc. These sulfonyl derivatives of aliphatic-aromatic pour depressing condensation products may also be used to improve the physical properties of paraffin wax itself, especially for use in coating paper, etc. and may also be used as a dewaxing aid in the dewaxing of lubricating oil basestocks.

The invention will be better understood from a consideration of the following experimental data.

*Example I*

35 grams of naphthalene and 5 grams of aluminum chloride were suspended in 75 cc. of o-dichlorbenzene and the temperature adjusted to 110° F. 259 grams of chlorinated wax (14.3% Cl) was then added to the reaction mixtures over a period of 30 minutes. The temperature was then adjusted to 125° F. and maintained thereat for a period of 2½ hours at which time 200 cc. additional o-dichlorbenzene and 10 grams of aluminum chloride were added, followed by 30 grams of benzene sulfonyl chloride added over a period of 30 minutes. After the addition of the benzene sulfonyl chloride the reaction temperature was maintained at 125° F. for a total reaction period of 3½ hours. The product was recovered by destroying the aluminum chloride and distillation by fire and steam to 600° F. A yield of 192 grams of product was obtained.

The product obtained as described above was tested for ordinary pour depressant potency by the standard ASTM procedure in two different types of waxy lubricants. The following results were obtained:

Pour point °F.
Original oil _____ +30
Original oil + 0.05% product _____ +5
Original oil + 0.1% product _____ −10
Original oil + 0.125% product _____ −15

The above data indicate that the condensation products of this invention are very effective pour depressors when tested by the standard ASTM pour point procedure, as they are at least as effective as the initial wax modifiers used.

These new condensation products are, however, unexpectedly far superior to the initial wax modifiers in regard to pour point stability. For example, when the initial and final condensation products of Example I were tested in a waxy lube oil basestock for pour stability by the Test V procedure previously referred to, the following data were obtained:

| Per Cent Commercial Depressant in Oil | Depressant | Solid Point by Test V Procedure |
|---|---|---|
| 1.25 | Commercial Cl-Wax Aromatic Product. | +18 |
| 1.25 | Present Invention | −19 |

The pour stability properties of the chlorwax-aromatic pour depressant prepared as described above were tested at Minneapolis and Warren during the winter of 1944-45. The test oil comprised B. R. 442 neutral plus 3.5% Pa. bright stock. The material was tested in two series of blends in concentrations of 0.5 and 1% of product commercial potency concentration. The results of the winter field testing are summarized below:

Overall field rating
Commercial chlorwax-aromatic polymer_____ 59
Present invention _____ 71

The pour stability rating is the percent of the times the blends are observed to be fluid for the period of observation.

It is not intended that the invention be limited to the specific materials which have been mentioned merely for the sake of illustration but only by the appended claims in which it is intended to claim all novelty inherent in the invention as well as all modifications coming within the scope and spirit of the invention.

What is claimed is:

1. A process which comprises reacting a chlorwax-naphthalene condensation product having a molecular weight of at least 1,000 and having pour depressing properties with benzene sulfonyl chloride in the ratio of about 1 to 50 parts by weight of sulfonyl chloride per 100 parts by weight of chlorowax-naphthalene condensation product in the presence of a Friedel-Crafts catalyst hydrolyzing and removing residual catalyst and subjecting the reaction product to distillation under reduced pressure up to a temperature of about 600° F. to obtain the desired final condensation product as distillation residue.

2. Process according to claim 1 carried out in the presence of an inert solvent.

3. Process according to claim 1 carried out in the presence of ortho-dichlorbenzene as solvent.

4. A Friedel-Craft condensation product of a benzene sulfonyl halogen compound with a condensation product having a molecular weight of at least 1,000 of a long chain aliphatic compound and an aromatic compound having at least one substituent group thereon, said final condensation product being soluble in waxy mineral lubricating oils and being substantially non-volatile up to about 600° F. under reduced pressure, and having good pour depressing properties both as measured by the ASTM pour point test and by the Test V procedure for pour stability.

5. A Friedel-Crafts condensation product of benzene sulfonyl chloride with a condensation product having a molecular weight of at least 1,000 of a chlorinated paraffin wax having about 10% to 20% chlorine content with about 10 to 20 parts by weight of naphthalene, said final condensation product being soluble in waxy mineral lubricating oils and being substantially non-volatile up to about 600° F. under reduced pressure and having good pour depressing properties both as measured by the ASTM pour point test and by the Test V procedure for pour stability.

6. Composition comprising a major proportion of a lubricating oil basestock and 0.05% to 10% by weight based on the lubricating oil basestock of a product comprising essentially a benzene sulfonyl halide derivative of a long chain aliphatic-aromatic Friedel-Crafts condensation product having a molecular weight of at least 1,000, said composition having an improved pour point and improved pour stability.

7. Composition comprising a major proportion of a waxy mineral lubricating oil having dissolved therein at least a pour depressing amount of a benzene sulfonyl halide derivative of a Friedel-Craft condensation product of chlorinated paraffin wax with an aromatic compound having at least one substituent group thereon.

8. Composition according to claim 7 in which the pour depressor is a Friedel-Craft condensation product of benzene sulfonyl chloride with a chlorwax-naphthalene condensation product having a molecular weight of at least 1,000 and having pour depressing properties.

9. Composition according to claim 7 having a stable pour point by the Test V procedure at least as low as $-10°$ F.

EUGENE LIEBER.
EDWARD P. CASHMAN.

REFERENCES CITED

The following references are of record in the file of this patent:

UNITED STATES PATENTS

| Number | Name | Date |
|--------|------|------|
| 2,142,934 | Bruson et al. | Jan. 3, 1939 |
| 2,257,969 | Loane | Oct. 7, 1941 |
| 2,368,670 | Lincoln et al. | Feb. 6, 1945 |
| 2,369,023 | Coward et al. | Feb. 6, 1945 |
| 2,410,885 | Lieber | Nov. 12, 1946 |
| 2,433,853 | Lincoln et al. | Jan. 6, 1948 |
| 2,483,499 | Lieber et al. | Oct. 4, 1949 |

OTHER REFERENCES

"Rec. Travaux Chimiques des Pays, Bas," Boeseken, vol. 33 (1914), pg. 321.

"Organic Chemistry of Sulfur," Suter (1944), pgs. 673–675 and 746.